(12) United States Patent
Kim et al.

(10) Patent No.: US 12,626,087 B2
(45) Date of Patent: May 12, 2026

(54) RADIO FREQUENCY IDENTIFICATION TAG ASSEMBLY, AND IDENTIFIABLE OBJECT TO WHICH RADIO FREQUENCY IDENTIFICATION TAG ASSEMBLY IS ATTACHED

(71) Applicant: SHUYOU (SHANGHAI) Technology CO., LTD., Shanghai (CN)

(72) Inventors: Youngdo Kim, Shanghai (CN); Xiaomeng Ma, Shanghai (CN)

(73) Assignee: SHUYOU (SHANGHAI) Technology CO., LTD., Shanghai (CN)

( * ) Notice: Subject to any disclaimer, the term of this patent is extended or adjusted under 35 U.S.C. 154(b) by 0 days.

(21) Appl. No.: 18/902,059

(22) Filed: Sep. 30, 2024

(65) Prior Publication Data

US 2025/0021787 A1      Jan. 16, 2025

Related U.S. Application Data

(63) Continuation of application No. PCT/CN2022/102805, filed on Jun. 30, 2022.

(51) Int. Cl.
*G06K 19/077* (2006.01)

(52) U.S. Cl.
CPC ... *G06K 19/07786* (2013.01); *G06K 19/0772* (2013.01)

(58) Field of Classification Search
CPC ......... G06K 19/07786; G06K 19/0772; G06K 19/00; G06K 19/07
(Continued)

(56) References Cited

U.S. PATENT DOCUMENTS 7,940,183 B2 * 5/2011 Kim ..................... H01Q 1/2225
343/702
10,218,073 B2 * 2/2019 Stowell .............. H01Q 15/0013
(Continued)

FOREIGN PATENT DOCUMENTS

CN      101416203 A      4/2009
CN      101777137 A      7/2010
(Continued)

OTHER PUBLICATIONS

PCT International Search Report, Application No. PCT/CN2022102805, Mar. 30, 2023, 4 pages.
(Continued)

*Primary Examiner* — Edwyn Labaze
(74) *Attorney, Agent, or Firm* — Quarles & Brady LLP

(57) ABSTRACT

A radio frequency identification tag component includes a metal plate with an upper surface and a lower surface; a radiation element comprising a tag housing, the tag housing is arranged along a side of the upper surface of the metal plate, the tag housing contain therein an IC chip, an antenna and a circuit board electrically connecting the IC chip with the antenna, wherein, the antenna is made of metal, and the antenna has a first segment and a second segment parallel to the upper surface of the metal plate, there is a first spacing between the first segment and the upper surface of the metal plate, and there is a second spacing between the first segment and the second segment, and the upper surface of the metal plate is at an angle to the plane in which the antenna is located.

19 Claims, 7 Drawing Sheets

(58) Field of Classification Search
USPC ................................. 235/492, 380, 487, 375
See application file for complete search history.

(56) References Cited

U.S. PATENT DOCUMENTS

| | | | | |
|---|---|---|---|---|
| 2009/0278690 A1 * | 11/2009 | Degani | ............ | G06K 19/07749 |
| | | | | 340/572.1 |
| 2017/0293832 A1 | 10/2017 | Pai | | |
| 2019/0266467 A1 * | 8/2019 | Kato | ................ | G06K 19/07773 |
| 2022/0069435 A1 * | 3/2022 | Liang | ....................... | H01Q 1/38 |

FOREIGN PATENT DOCUMENTS

| | | | | | | |
|---|---|---|---|---|---|---|
| CN | 101784750 | A | | 7/2010 | | |
| CN | 101861593 | A | * | 10/2010 | ....... | G06K 19/07749 |
| CN | 102263324 | A | | 11/2011 | | |
| CN | 102521645 | A | | 6/2012 | | |
| CN | 102982365 | A | | 3/2013 | | |
| CN | 104246630 | B | * | 9/2017 | ....... | G06K 19/07752 |
| CN | 216792909 | U | | 6/2022 | | |
| EP | 1936544 | A1 | | 6/2008 | | |
| EP | 2101288 | A1 | | 9/2009 | | |

OTHER PUBLICATIONS

The State Intellectual Property Office of the People's Republic of China, First Office Action, Application No. 202280012347.0, Aug. 13, 2025, 16 pages.
The State Intellectual Property Office of the People's Republic of China, Second Office Action, Application No. 202280012347.0, Jan. 6, 2026, 16 pages.

* cited by examiner

Farfield Directivity Absolute Value(Phi=90)

1

RADIO FREQUENCY IDENTIFICATION TAG ASSEMBLY, AND IDENTIFIABLE OBJECT TO WHICH RADIO FREQUENCY IDENTIFICATION TAG ASSEMBLY IS ATTACHED

CROSS-REFERENCE TO RELATED APPLICATIONS

This application is a continuation of International Patent Application No. PCT/CN2022/102805 filed Jun. 30, 2022, the disclosure of which is incorporated herein by reference in its entirety and for all purposes.

FIELD OF THE INVENTION

The present invention relates to the field of radio frequency identification, more specifically, to a tag component for radio frequency identification and identifiable objects attached with radio frequency identification (RFID) tag components.

BACKGROUND

In recent years, specialized RFID tags in various forms and special packages have been widely used in various technical fields for the purpose of moving, mounting, managing, maintaining, etc. indoor and outdoor properties and equipments. According to application environment and RFID tag attachment conditions, various RFID tags are used according to their size, attachment manner, special material selection, required identification performance, etc. In particular, RFID tags in the UHF band have the characteristics of utilizing backscattering, not only the reflection, attenuation, absorption, and diffraction in the surrounding radio wave environment, but also the material and location of the attached object and the tagging conditions will greatly affect the performance of the tags.

Usually the polarization inconsistency caused by the division as circular polarization and linear polarization and the sharp drop in recognition rate caused by the height difference between the reader antenna and the tag mounting height are the main factors that determine the completion of the RFID system. The peak radiation gain and readable identification distance of a general RFID tag are formed in a direction at a right angle to/perpendicular to the surface of the attached object. Due to the characteristics of the RFID application environment, when the tag attachment location is inconsistent with the height of the reader antenna or the tag is identified in a direction shifted left and right from the tag attachment location, the radar cross section (RCS) cross-sectional area is reduced, causing the tag identification distance to decrease sharply. In actual multi-layer shelf object and property management, external facility property management with relatively high tag attachment heights, and object identification environments in automated warehouses, such problem of reduced tag identification distance is considered as a dangerous factor reducing the reliability of the RFID system and affecting the stability of the integrated system. Therefore, as the application scope of utilizing RFID technology expands in various industrial fields, there is a need for specialized RFID tag technology that prevents the performance of tags from decreasing with the varying heights of tag attachment locations and that can take into account the on-site work process.

SUMMARY

The present invention aims to overcome the above and/or other problems in the prior art. Through the radio frequency identification tag component provided by the present invention, even when identifying by the user's RFID reader at a location that is higher or lower or deflected left/right relative to the location of the RFID tag antenna, it may be identified easily by changing the attaching direction of the same tag, thereby helping to solve the problem of tag performance deviation or low tag performance incurring with the varying height of the tag setting location.

According to a first aspect of the present invention, a radio frequency identification tag component is provided, wherein the radio frequency identification tag component includes: a metal plate with an upper surface and a lower surface; a radiation element comprising a tag housing, the tag housing is arranged along a side of the upper surface of the metal plate, the tag housing contain therein an IC chip, an antenna and a circuit board electrically connecting the IC chip with the antenna, wherein, the antenna is made of metal, and the antenna has a first segment and a second segment parallel to the upper surface of the metal plate, there is a first spacing between the first segment and the upper surface of the metal plate, and there is a second spacing between the first segment and the second segment, and the upper surface of the metal plate is at an angle to the plane in which the antenna is located.

Preferably, the IC chip operates in the UHF band.

Preferably, one end of the first segment of the antenna is connected to one end of the second segment via a conductor.

Preferably, the conductor is a bent portion between the first segment and the second segment of the antenna, and the first segment, the second segment and the bent portion integrally form the antenna.

Preferably, the conductor is a wire arranged within the housing separate from the antenna.

Preferably, the plane in which the antenna is located is perpendicular to the upper surface of the metal plate.

Preferably, the metal plate serves as a ground plate of the radio frequency identification tag component.

Preferably, the radio frequency identification tag component is disposed by attaching a lower surface of the metal plate to an object to be identified.

Preferably, the housing has mounting grooves therein to embed the antenna and the circuit board.

Preferably, the mounting groove includes: a plurality of grooves for embedding the antenna, wherein the plurality of grooves include a plurality of horizontal grooves and a plurality of vertical grooves, the plurality of horizontal grooves include a first horizontal groove and a second horizontal groove, the first horizontal groove is configured to embed the first segment of the antenna, the second horizontal groove is configured to embed the second segment of the antenna, and the vertical groove is configured to embed the conductor; and a plurality of accommodation spaces, each of the plurality of accommodation spaces is used to accommodate the circuit board.

Preferably, each of the plurality of horizontal grooves intersects at least one of the plurality of accommodation spaces, the plurality of horizontal grooves are parallel to the upper surface of the metal plate, and the plurality of horizontal grooves are at different distances from the upper surface of the metal plate, and the plurality of accommodation spaces are separated from the vertical grooves by a plurality of distances.

Preferably, the first segment of the antenna extends to a third horizontal groove of the plurality of horizontal grooves, and/or the second segment of the antenna extends to a fourth horizontal groove of the plurality of horizontal grooves.

Preferably, the first horizontal groove is configured to be able to embed the first segment of the antenna of different lengths, and the second horizontal groove is configured to be able to embed the second segment of the antenna of different lengths.

Preferably, the tag housing is fixed to the metal plate through a locating mechanism such that the lower surface of the tag housing remains horizontal relative to the upper surface of the metal plate.

Preferably, the locating mechanism includes a threaded piece that fixes the tag housing to the metal plate and a lattice-shaped fastener located on the upper surface of the metal plate.

Preferably, the metal plate is embossed, stamped, laser processed or printed with visual identifiers.

Preferably, the direction of the peak radiation gain of the radio frequency identification tag component is tilted from a direction perpendicular to the metal plate.

In addition, the RFID tag component of the present invention is designed to use thin metal wires as antennas. This tag radiation platform in wire form has the following advantages due to the softness and thinness of the material itself: it makes it easier to use a 3D tag shape for electrical impedance matching of RFID tag antennas and makes it possible to achieve efficient tag design within limited space area. In addition, it also provides the following advantages: due to the characteristics of the soft wire material, in the process of center frequency control and electrical matching optimization of the RFID tag, the electrical design of the RFID tag can be easily changed by simply changing the length of the wire platform and controlling the mutual spacing of the metal wires. To realize the RFID tag radiator, such 3D metal wires are placed inside high-temperature-resistant plastic members and formed through ultrasonic welding or injection molding processes. In order to electrically connect a metal wire as a conductive radiation medium with an IC chip, a small PCB block is constructed and an IC chip is bonded thereto, and metal wires are bonded to both sides of the small PCB block to construct a metal wire radiator. The three-dimensional tag radiator structure constructed as above is combined with another metal plate having a certain area below; the tag radiator is fixed and combined along sides of the metal plate. As such, the relative location that the tag radiator is combined with the metal plate can be used as an important design parameter to determine the radiation gain direction of the tag antenna.

In addition, since the metal plate and the tag radiator are constructed separately as described above, embossing and stamping can be performed on the surface of the metal plate. This metal plate surface embossing/stamping operation can semi-permanently enable users to make intuitive and visual identification and distinguishment, providing the advantages of introducing RFID tags while maintaining compatibility in industrial fields that have traditionally required such methods of processing.

According to a second aspect of the present invention, an identifiable object to which the radio frequency identification tag component of any one of the precedings is attached is provided.

Preferably, the identifiable object includes facility properties and shelves.

Other characteristics and aspects will become clear through the following detailed description, drawings and claims.

BRIEF DESCRIPTION OF THE DRAWINGS

In order to illustrate the embodiments of the present invention or the technical solutions in the prior art more clearly, the drawings needed to be used in the description of the embodiments or the prior art will be briefly introduced below. Apparently, drawings in the following description are some embodiments of the present invention. For those of ordinary skill in the art, it is possible to obtain other drawings based on these drawings without exerting creative efforts, wherein.

DETAILED DESCRIPTION

Figure 1:
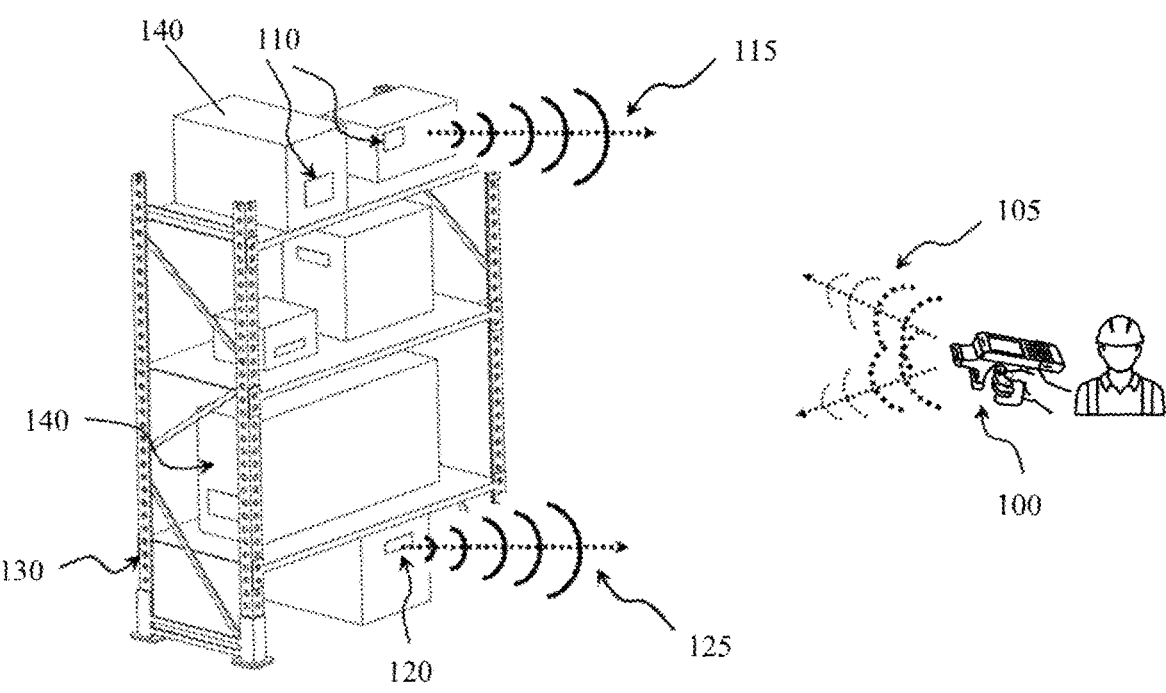
FIG. 1 shows a schematic diagram of the radiation areas when using a portable reader to identify conventional RFID tags 110, 120 attached at different heights.

In order to make the aforementioned objects, characteristics and advantages of the present invention more apparently and readily to appreciate, a detailed description of the embodiments of the present invention will be given in conjunction with the accompanying drawings.

Many specific details are set forth in the following description in order to fully understand the present invention. However, the present invention can also be implemented in other ways different from those described here. Those skilled in the art can make generalizations similarly without departing from the connotation of the present invention. Therefore, the present invention is not limited to the specific embodiments disclosed below.

Secondly, the present invention will be described in detail in conjunction with schematic diagrams. When describing the embodiments of the present invention in detail, for the convenience of explanation, the cross-sectional diagrams showing the device structure will not be partially enlarged according to the general scale, and the schematic diagrams are only examples and should not limit the protection scope of the present invention. In addition, the three-dimensional dimensions of length, width and depth should be included in actual production.

A detailed description of the present invention will be described below, and it should be noted that, in the detailed description of these embodiments, all features of the actual embodiments may not be described in detail in this description for the sake of brevity and conciseness of the description. It should be understood that, in the actual implementation of any one of the embodiments, just as in the process of any engineering project or design project, in order to achieve the developers' specific goals and in order to meet system-related or business-related restrictions, a variety of concrete decisions are often made, and this varies from one implementation to another. In addition, it should also be understood that, although the effort made in such developing process may be complex and time-consuming, some variations such as design, manufacture and production on the basis of the technical contents disclosed in the disclosure are just customary technical means in the art for one of ordinary skilled in the art associated with the technical contents disclosed in the present disclosure, and the present disclosure should not be construed as insufficient disclosure.

Unless otherwise defined, technical or scientific terms used in the claims and the description shall have the ordinary meaning understood by one of ordinary skills in the art to which this invention belongs. "First", "second" and similar terms used in the description and claims of the present invention do not imply any order, quantity, or importance, but are merely used to distinguish different components. "One", "a/an" and the like do not imply any quantitative limitation, but rather means "at least one". "Including" or "comprising" and the like means that an element or item appearing before "including" or "comprising" covers an element or item and its equivalents listed after "including" or "comprising" and does not exclude other elements or items. "Connected", "coupled" and the like are not limited to physical or mechanical connections, nor are they limited to direct or indirect connections.

In the present disclosure, unless otherwise specified, all embodiments and preferred embodiments mentioned herein may be combined to form new technical solutions. In the present disclosure, unless otherwise specified, all technical features and preferred technical features mentioned herein may be combined to form new technical solutions.

In the description of the embodiment of the present application, the term "and/or" is only an association relationship describing the associated object, indicating that there may be three kinds of relationships, such as A and/or B, which may indicate that there are three cases: A alone, A and B simultaneously, and B alone. In addition, the character "/" herein generally indicates that the previous and latter associated objects is an "or" relationship.

The RFID tag proposed in the present invention can be attached to a specific object or property, and the far-field radiation direction of the tag will be selectively deflected toward the antenna direction of the fixed/handheld reader, maximizing the line-of-sight identifiable distance of the RFID tag. Preferably, the RFID tag of the present invention is used in the UHF band.

Compared with the AIDC (Automatic Identification Data Tracking) field, passive RFID tags provide a characteristic of enabling batch identification of multiple tags in a non-contact radio frequency (RF) manner in far-field areas. However, the implementation of optimal far-field identification of such RFID tags requires a stable on-site environment without reflection, diffraction, attenuation/absorption of radio waves between RFID tags and tag antenna, and consistent polarization directions of reader antenna and tag antenna, as well as the tag identification direction maintained in the line-of-sight direction.

Due to the characteristics of radio wave radiation and the backscattering characteristics of RFID, the phenomenon of reflection or diffraction of RF radio waves based on the conductive medium in the RFID application environment leads to the formation of multiple paths between the RFID tag antenna and the reader antenna, the radio waves incident from these multiple paths on the tag antenna are composed of the superimposition of radio waves of different phases. In particular, the destructive interference phenomenon between the tag antenna and the reader antenna based on the phase difference is the fundamental reason why the identification distances of RFID tags are sharply reduced and the stability of the RFID system is reduced. In addition, in a far-field tag identification environment, being adjacent to high-loss materials such as high-dielectric materials will reduce the RF wave signal intensity and change the RF center frequency of the tag, hindering the construction of an optimal tagging environment.

In addition, when the on-site application environment and the tagging situation of the RFID tag are inconsistent with the optimal polarization direction of the reader antenna, the reader antenna generally uses circular polarization (CP) to alleviate the problem of polarization inconsistency. That is to say, generally most of the special RFID tags commercially available commonly exhibit linear polarization (LP) characteristics. The issue of inconsistent tagging in vertical/horizontal direction is improved by using circular polarization of the reader antenna. However, because the polarization of an RFID tag designed to be linearly polarized is inconsistent with that of a reader antenna using circular polarization, a 3 dB power loss will occur, resulting in a degradation of the far-field tag identification performance.

In addition, recently, due to the expansion of the application range of RFID technology in various industrial fields, application examples in which tags attached to shelves in warehouses are high or require tagging in a direction tilted with respect to the horizontal plane. For RFID tags, due to the material characteristics and attachment location of the attached object, the interference effect of radio waves in the application environment, the polarization characteristics of the tag and reader antennas, the tag deterioration characteristics due to long-term exposure to high temperature environments, or the like, the electrical performance of the tag itself will be greatly affected. When a RFID tag attached to an object loaded on a higher shelf 230 or a tag 110 attached to an external facility property at a higher height has a height deviation from the antenna of the user's fixed/portable reader 100, such a height deviation causes the reader antenna to identify the tag at a tilted angle relative to the tag. In FIG. 1, there is a height deviation between the radiation pattern 115 of tag 110 attached to an object at a higher height and the radiation pattern 125 of tag 120 attached to an object at a lower height and the radiation pattern 105 of the antenna of the reader 100, so that the reader 100 need to identify tags 110, 120 at a tilted angle relative to the tags 110, 120. In this situation the Radar Cross Section (RCS) tag cross-section decreases in proportion to the tilted angle, resulting in a sharp reduction in the far-field tag identification distance. In addition, the far-field radiation gain characteristics of general tags are distributed at certain angles, and the radiation gain distribution of a tag forms a maximum value based on the vertical direction of the front side of the tag. The radiation gain distribution of such a tag exhibits a sharp reduction in radiation gain characteristics at a tilted angle. The half-power radiation gain angle (3 dB radiation angle) of a typical metal tag antenna is formed around 30°~60°, although it varies depending on the volume of the tag antenna, the size of the attached metal object, and the design of the RFID tag antenna. That is, when a general metal tag antenna is attached to a higher load on a shelf or attached to a facility property at a higher height, a considerable amount of radiation power will be lost when a user on the ground identifies the antenna through the portable reader 100. This trend leads to the reduction of tag identification performance as the height difference increases.

FIG. 1 shows a schematic diagram of the radiation area depending on the tag attachment location heights when conventional RFID tags 110, 120 are identified by using a portable reader 100.

Typically, the maximum radiation gain area is formed in a direction perpendicular to the object 140 to which the conventional RFID tags 110, 120 are attached, and the maximum identification distance of the reader antenna is achieved in the same direction in an interference-free surrounding environment. In this case, since the radiation directions of the RFID tags 110, 120 and the radiation direction 105 of the reader antenna 100 are limited, in the case of identifying tags in a tilted direction with respect to the front of the attached tag, considerable power loss will occur. In such an application environment, the tilted angle of the reader antenna will greatly reduce the RCS cross-sectional area of the tag and will dramatically lose the signal intensity received by the reader antenna. In particular, when the tag setting heights of the external facility properties are high or the tag attachment location height of the indoor loading rack 130 has a large deviation relative to the parallel height location of the RFID reader antenna 100, the resulting reduced tag identification distance and a low identification rate are important factors in maintaining the stability of the RFID system.

In order to overcome the shortcomings in the above application environment, a method is proposed that inserts another mechanism into the attached object to mechanically adjust the direction of the peak radiation gain of the RFID tag toward the direction of the reader antenna. However, such a method of mechanically adjusting the radiation directivity angle which causes the setting direction of a tag attached to high facility properties towards the ground will incur quite expensive additional cost of introducing RFID tags, and it is also difficult to quantitatively adjust the setting direction according to the tag height. In addition, in such an application environment where there is a height difference, RFID tags can be identified by increasing the height of the antenna on an autonomous robot that moves along a predetermined path or utilizing a mobile RFID device disposed on a drone device as a space-form flying body.

The present invention relates to a passive RFID tag which is used to maximize the electrical reliability of tags of a RFID system by more stably identifying special tags attached to high facility properties and high shelves by controlling the far-field readable identification directionality of RFID tags. In order to achieve the above objectives, the present invention is proposed to achieve the following objectives: to overcome the degradation and peeling phenomenon of the conductive medium of existing RFID tags by utilizing thin metal wires with a three-dimensional structure (3D), and to provide an object which can widely apply RFID radiation structures to metal/non-metal materials by having an additional metal plate itself.

Generally, the peak far-field radiation direction of RFID tag antennas in the UHF band is affected in various ways based on the design and structure of the electrical tags, the attached ground plane and the relative tag locations, and the tag topology changes in planar or three-dimensional structure. Usually, in the cases that the reader antenna and polarization are consistent by forming the peak radiation gain of the tag antenna at the vertical front direction of the object to which the tag is attached, RFID tags used in RFID systems can obtain the peak readable identification distance in the front direction in which the tag is attached. Common RFID tags as mentioned above have the following characteristics: when the attaching height of the RFID tag is higher or lower than the reader antenna of the reader user, the reader antenna will be detached from the peak readable identification distance of the tag antenna, causing the tag identification distance to decrease sharply. In particular, since the height position of external property facilities in the transportation and electric power industries or objects loaded on shelves in large warehouses are set higher than the reader user on the ground, a peak tag cross section (RCS radar cross section) on the line of sight cannot be obtained. In this case, in order to mechanically direct the tag radiation gain direction toward the ground, an auxiliary tool or a method of setting at a tilted angle when attaching the tag can be used, but it is difficult to adjust the precise inclination according to the height deviation, and there will be additional setup cost.

Figure 2:
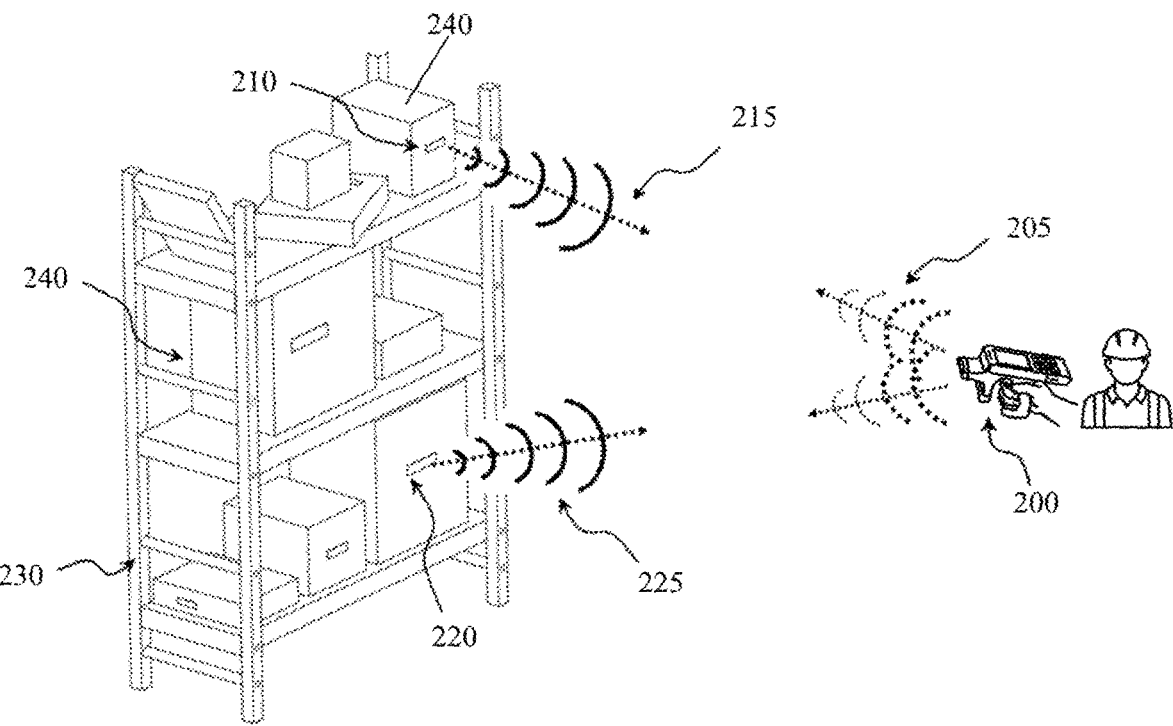
FIG. 2 shows a schematic diagram of the radiation areas when using a portable reader to identify RFID tags 210, 220 attached at different heights in an embodiment of the present invention.

FIG. 2 schematically presents the advantage of radiation areas depending on the tag attaching heights when utilizing an RFID reader to identify the RFID tag 210 according to an embodiment of the present invention. Usually, the consistent directive radiation directions of the RFID tag and the reader antenna and the consistent polarization of the RFID reader are factors that determine the RFID identification distance performance. In particular, when the directive radiation angle of the RFID tag 210 disposed at a higher height (e.g., disposed on an object 240 on a shelf 230) relative to the RFID reader user is consistent with the angle of radiation pattern 205 of the user's reader antenna 200, the identification distance performance of the RFID tag can be greatly improved. A tag having such a function that the main radiation directivity of the RFID tag is variable provides the following advantage: even identified by user's RFID reader at a position that is higher or lower or deflected left/right compared to the position of the RFID tag antenna, it can also be easily identified by changing the attachment direction of the same tag, thereby fundamentally solving the problem of tag performance deviation or lower tag performance depending on the height difference of the tag setting position.

As for the tag radiation element used in the present invention, existing label or PCB materials and ceramic materials limit durability of the RFID tag due to deterioration and peeling phenomenon when in a high temperature environment for a long time. Thin metal wires are designed to be used as a fundamental solution. This tag radiation platform in wire form has the following advantages due to the softness and thinness of the material itself: it makes it easier to provide a 3D tag shape for electrical impedance matching of RFID tag antennas and makes it possible to achieve efficient tag design within limited space area. In addition, it also provides the following advantages: due to the characteristics of the soft wire material, in the process of center frequency control and electrical matching optimization of the RFID tag, the electrical design of the RFID tag can be easily changed by simply changing the length of the wire platform and controlling the mutual spacing of the metal wires. To realize the RFID tag radiator, such 3D metal wires are placed inside high-temperature-resistant plastic components and formed through ultrasonic welding or injection molding processes. In order to electrically connect metal wires as a conductive radiation medium with an IC chip, a small PCB block is constructed and IC chips are bonded therein, and metal wires are bonded to both sides of the small PCB block to construct a metal wire radiator. The three-dimensional tag radiator structure constructed as above is combined with another metal plate having a certain area below; the tag radiator is fixed and combined along sides of the metal plate. As such, the relative position of the tag radiator combining with the metal plate can be used as an important design parameter to determine the radiation gain direction of the tag antenna.

In addition, since the metal plate and the tag radiator as described above are constructed separately, embossing and stamping can be performed on the surface of the metal plate. This metal plate surface embossing/stamping operation can semi-permanently enable users to identify and distinguish intuitively and visually, providing the advantage of introducing RFID tags while maintaining compatibility in industrial fields traditionally requiring such method of processing. In particular, performing such embossing/stamping operation on the tag itself in an existing form of nameplate directly or indirectly destroys the tag and is therefore unachievable.

In order to be used for both metal attached materials and non-metal attached materials, the general UHF band special RFID tags are designed so that the RFID tag itself has a limited metal ground plane, and the far-field radiation pattern forms a peak radiation gain in a direction perpendicular to the attached object. When the object to which the tag is attached is a metal material, the far-field tag radiation gain and the tag's radiation pattern directivity will be affected depending on changes in the metal plate of the tag structure itself and the attaching position relative to the metal material as the attached object.

In the present invention, in order to easily realize the stereoscopic shape of the three-dimensional tag and enhance the durability and reliability of the tag in high-temperature and low-temperature cycling environments and ultra-high temperature environments, instead of the existing PCB material or bulk form of high dielectric constant ceramic material, conductive metal wires are used to construct the tag radiation element.

Figure 3:
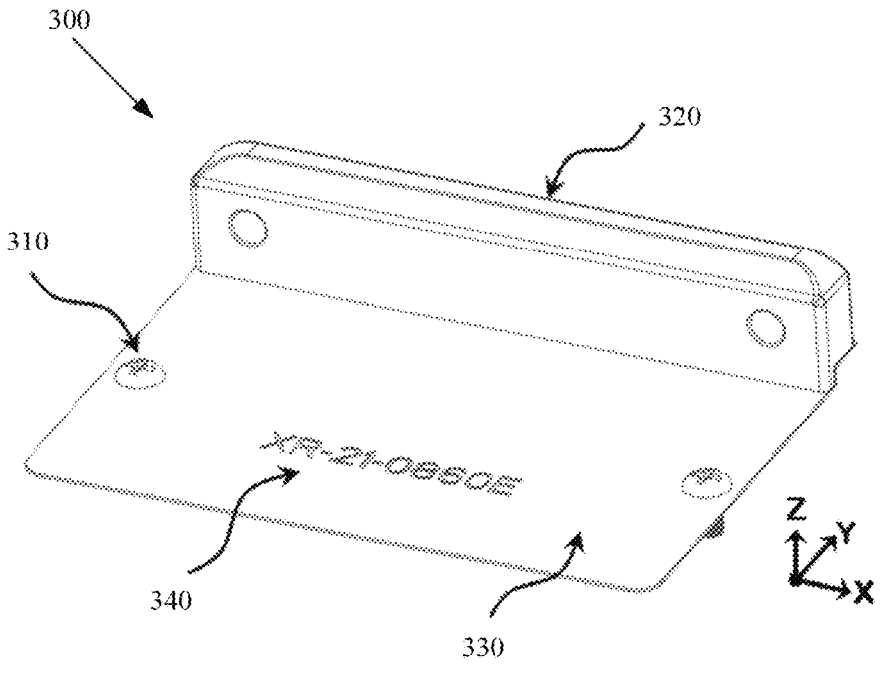
FIG. 3 shows a perspective view of an RFID tag component with variable main radiation directivity according to an embodiment of the present invention.
Figure 4:
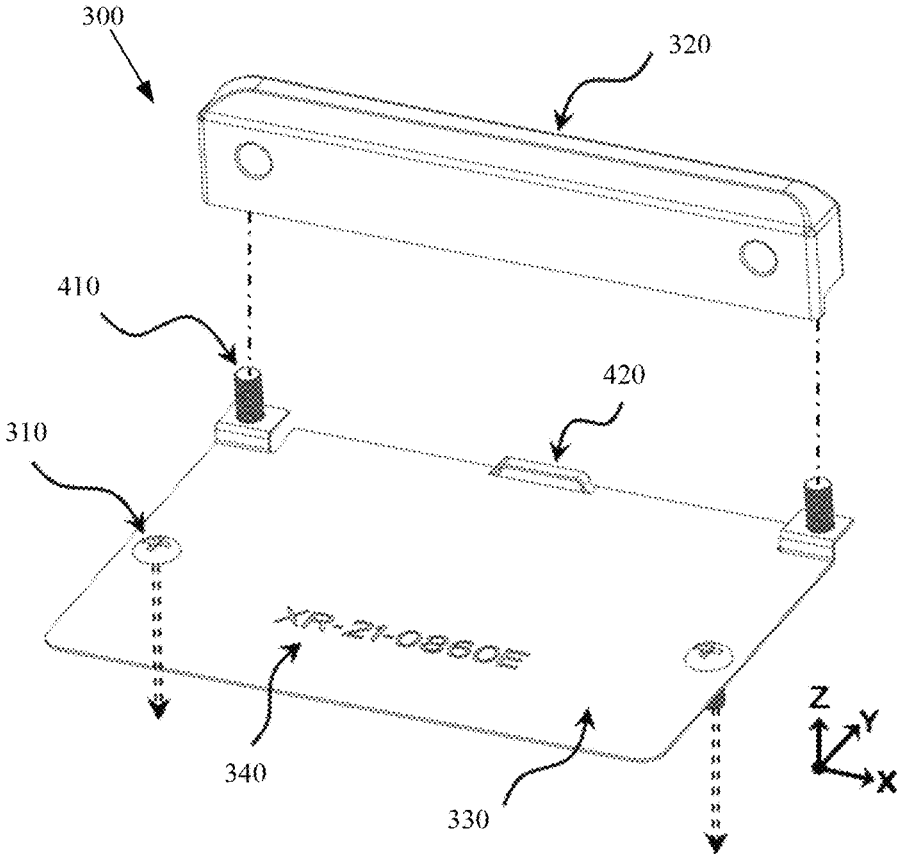
FIG. 4 shows a schematic exploded view of an RFID tag component according to an embodiment of the present invention.
Figure 5:
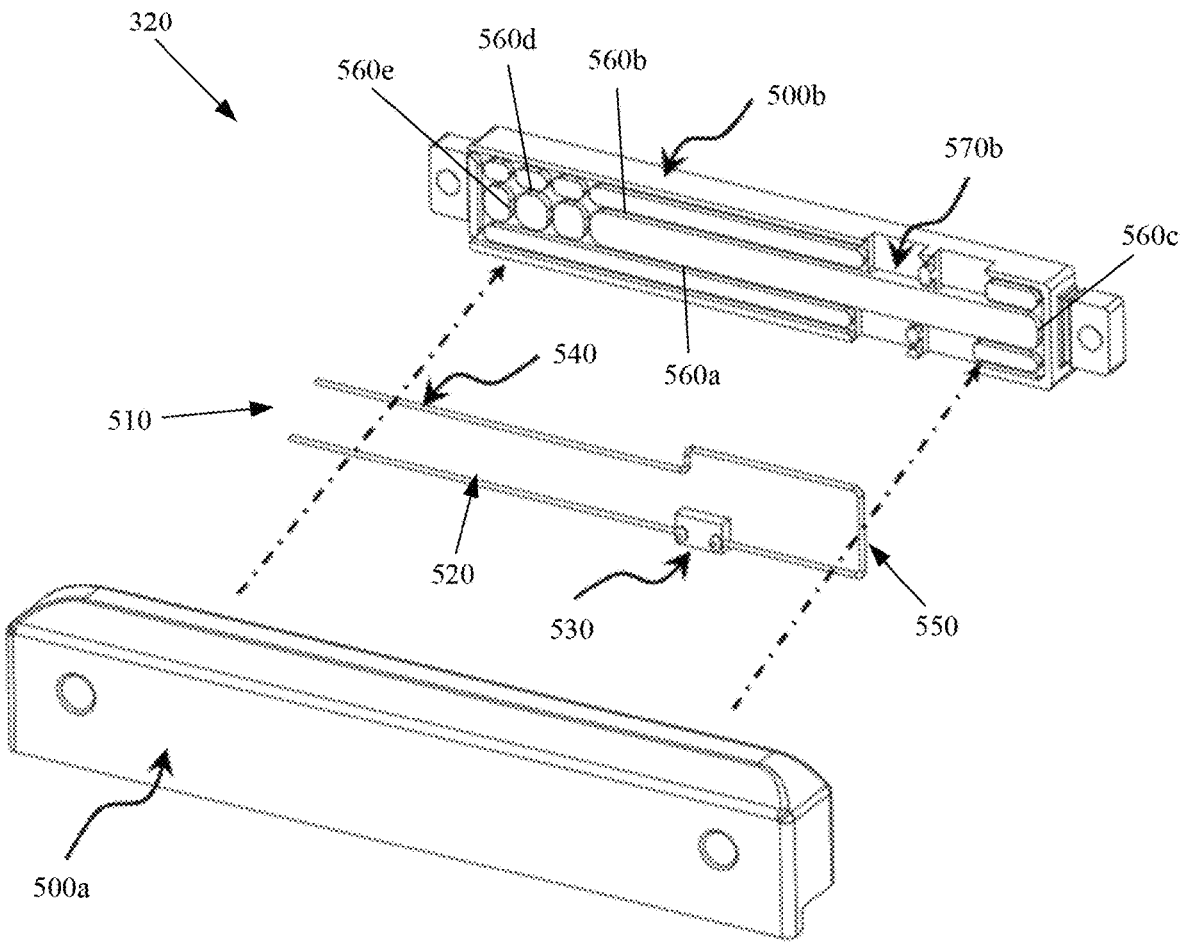
FIG. 5 shows an exploded perspective view of a radiation element according to an embodiment of the invention.
Figure 6A:
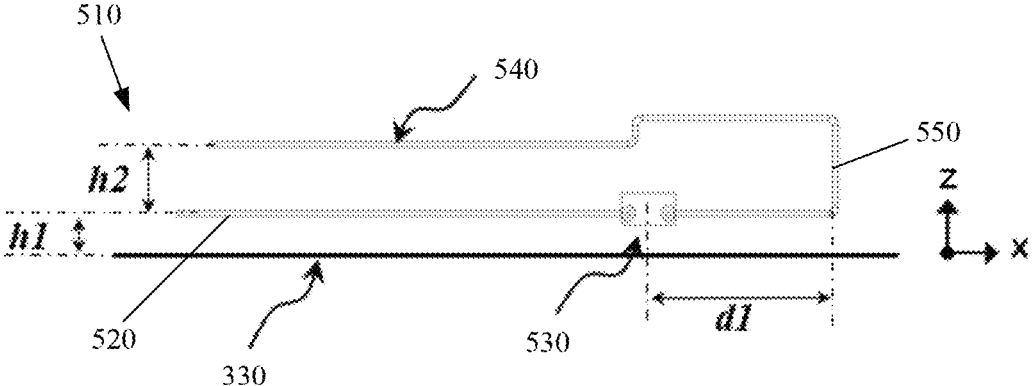
FIG. 6a and FIG. 6b show front views of metal wires used as tag antennas mounted in tag housings according to embodiments of the invention.
Figure 6B:
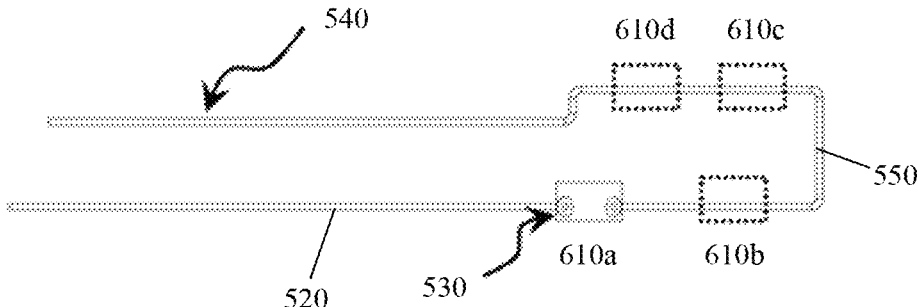

FIG. 3 shows a perspective view of an RFID tag component 300 with variable main radiation directivity according to an embodiment of the present invention, FIG. 4 shows a schematic exploded view of the RFID tag component 300 according to an embodiment of the present invention, FIG. 5 shows an exploded perspective view of the radiation element 320 according to an embodiment of the present invention, FIG. 6a and FIG. 6b show front views of metal wires used as the tag antenna 510 mounted in the tag housing 500a and the tag housing 500b according to embodiments of the present invention, wherein FIG. 6a shows the configuration of the PCB 530 in the first segment 520 at a distance d1 from the side connected to the conductor 550, and FIG. 6b shows the locations 610a, 610b, 610c, 610d of the PCB 530 that can be changed in order to change the impedance of the radiation element 320. The following explanation is made with reference to FIG. 3-FIG. 6b.

FIG. 3 shows a perspective view of an RFID tag component 300 with variable main radiation directivity according to an embodiment of the present invention. The RFID tag component 300 may include a radiation element 320 and a metal plate 330. The radiation elements 320 may be disposed along sides of the upper surface of the metal plate 330. The metal plate 330 may be used as a ground plate for the RFID tag component 300. The mounting mechanism 310 may enable the lower surface of the metal plate 330 to attach to an object to be identified (e.g., an item on a shelf or a property facility). In one embodiment, the mounting member 310 may be a threaded part and may be located on both sides of the metal plate 330, while one skilled in the art may contemplate any other mounting mechanism, mounting location or attaching method, for example, gluing. By performing embossing/stamping 340 on the metal plate 330 that can be recognized intuitively and used semi-permanently by the user, an advantage of further expanding the application range of RFID tags can be provided. Generally in the automotive or machinery industrial field, in order to identify equipment and properties, various identifiers have been processed by mechanical embossing/stamping on the surface of aluminum or copper plates. However, in the case of RFID tags, it is difficult to find commercial tags that can be stamped/embossed on the surface, and the physical stamping/embossing operation provided by some of the RFID tags causes damage to the functionality of the tag. In the tag component 300 proposed in the present invention, the radiation element 320 and the metal plate 330 capable of realizing the embossing/stamping 340 can be constructed separately, and then combined together. In addition, such metal plates 330 may be constructed of different materials (such as aluminum, stainless steel) in different sizes and thicknesses.

FIG. 4 shows a schematic exploded view of an RFID tag component according to an embodiment of the invention. The metal plate 330 can be of any size and thickness and can be stamped/embossed 340. The material, thickness, and size of the metal plate 330 may be selected taking into account the configuration of the device that implements the stamping/embossing process, and the electrical characteristics of the tag antenna of the RFID tag component may be selected regardless of the material, thickness, and size of the metal plate 330. According to the environment and needs of the user, stamping/embossing operations, laser processing, and paint-like printing operations can be selectively performed on the surface of the metal plate 330.

The radiation element 320 may be mounted to the upper surface of the metal plate 330 through various fixing mechanisms. A fixing mechanism for mounting the radiation element 320 to the upper surface of the metal plate 330 is shown in FIG. 4, which may include a bolt element 410 and a lattice-shaped fastener 420. A screw hole portion for accommodating the threaded part 410 may be configured to protrude from the upper surface of the metal plate 330 to keep the lower surface of the metal plate 330 flat for mounting to the attached object, and the lattice-shaped fastener 420 may protrude from the metal plate 330 for reinforcing the connection strength with the radiation element 320. By increasing connection strength through mechanically connecting the radiation element 320 and the metal plate 330 with, for example, the threaded piece 410, and by maintaining the constant spacing between the lower surface of the radiation element 320 and the upper surface of the metal plate 330 through the lattice-shaped fastener 420, the attaching surface may be kept flat and stable when attaching the RFID tag component 300 to the facility property. Those skilled in the art may contemplate that one or both of them may be selected for mounting, or any other mounting structure may be used. The radiation element 320 may be mounted so that the plane where the tag antenna 510 contained in the radiation element 320 (as shown in FIG. 5) is located is at an angle to the upper surface of the metal plate 330. Preferably, the angle may be between 30° and 150°. More preferably, the plane where the tag antenna 510 is located may be perpendicular to the upper surface of the metal plate 330. In this manner, the peak radiation gain of the RFID tag component 300 may not be in a direction perpendicular to the surface of the metal plate 330 (and thus the surface of the identifiable object attached to).

FIG. 5 shows an exploded perspective view of a radiation element 320 according to an embodiment of the invention. The radiation element 320 may include a three-dimensionally shaped thin metal wire used as the tag antenna 510, and the tag antenna 510 may be mounted inside the tag housings 500a and 500b. In order to improve the high-temperature reliability and durability of the tag antenna 510, the metal used for the tag antenna 510 may be copper, iron, aluminum, gold or alloy and other metals that can be made into wires. The tag housings 500a and 500b may be formed of high-temperature resistant plastic and tightly engaged by ultrasonic welding after being constructed separately. The high temperature resistant plastic may be epoxy resin. Those skilled in the art can also contemplate other ways to tightly engage the tag housings 500a and 500b. The tag housing 320 may also include an IC chip therein. In order to connect the tag antenna 510 to the IC chip, the PCB 530 may be used as a connection medium. The PCB 530 may be configured to engage an IC chip therein and have electrodes on both sides for engaging the tag antenna 510. Tag antenna 510 may be engaged to the PCB 530 by soldering, and other engaging methods may be contemplated by those skilled in the art.

According to an embodiment of the present invention, the tag antenna 510 may include a first segment 520 and a second segment 540, and the PCB 530 may be located on the first segment 520 of the tag antenna 510. The first segment 520 of the tag antenna 510 may be connected at one side to the second segment 540 by a conductor 550 and may be disconnected from the second segment 540 at the other side (i.e., the side opposite to the conductor 550) of the first segment 520, thereby, the first segment 520 and the second segment 540 may couple to each other at the one side.

The conductor 550 may be a bent portion integrally forming the tag antenna 510 with the first segment 520 and the second segment 540. Alternatively, conductor 550 may be a separate wire fixed inside tag housing 500b and connected to the first segment 520 and the second segment 540 after mounting. There may be a first distance h1 between the first segment 520 and the upper surface of the metal plate 330, and a second distance h2 between the first segment 520 and the second segment 540 (as shown in FIG. 6a).

In addition, the tag housings 500a, 500b may have mounting grooves inside to embed the tag antenna 510 and the PCB 530 therein so that the tag antenna 510 can be stably fixed inside the tag housings 500a, 500b and maintained in an effective conjugate impedance matching state. The mounting grooves may include multiple grooves for accommodating the tag antenna 510 and multiple accommodation spaces for accommodating the PCB 530 to provide a variety of different paths in order to improve the effective resonance length of the tag antenna 510 within a limited area. Such a variety of paths can provide the following advantage: during controlling the center frequency of the radiation element 320 or manufacturing the tag component 300, the performance deviation can be easily improved to achieve the desired performance of the radiation element 320 without excessive changes to the existing materials or designs.

In one embodiment, the plurality of grooves may include a plurality of horizontal grooves and a plurality of vertical grooves, including a first horizontal groove 560a for accommodating the first segment 520 of the tag antenna 510, a second horizontal groove 560b for accommodating the second segment 540, and a vertical groove 560c for accommodating the conductor 550.

FIG. 6a and FIG. 6b show front views of metal wires used as tag antennas 510 mounted inside the tag housings 500a, 500b according to an embodiment of the present invention, wherein FIG. 6a shows the configuration of PCB 530 disposed in the first segment 520 at a distance d1 from the side connected to the conductor 550, and FIG. 6b shows the locations 610a, 610b, 610c, 610d of the PCB 530 that can be changed in order to change the impedance of the radiation element 320. These locations are only shown as examples, and those skilled in the art may contemplate the location of the PCB 530 as needed.

The RFID tag component 300 containing the tag antenna 510 proposed in the present invention may include the following important design parameters: in the three-dimensional structure, the distance d1 between the PCB 530 engaged with the IC chip and the side where the antenna 510 and the conductor 550 are connected, the distance h1 between the first segment 520 of the tag antenna 510 and the upper surface of the metal plate 330, the distance h2 between the first segment 520 of the tag antenna 510 and the second segment 540 of the tag antenna 510, the length of the antenna 510 (including the first segment 520, the second segment 540 and the conductor 550) that can control the effective resonance length of the tag antenna 510. These important design parameters can provide the following advantage: in order to perform complex impedance matching on the impedance of IC chips in various UHF band, by making one or more design parameters of the RFID tag component 300 optimum, the electrical matching may be changed easily within the same structure without changing the existing material and appearance of the tags. In particular, the relative location change of the PCB 530 engaged with the RFID IC chip can be used as the design parameter that most affects the impedance change of the particular IC chip, providing design compatibility that can deal with various commonly used IC chips without changing the structure of the existing tag housing. By adjusting the distance between the PCB 530 and the conductor 550 (i.e., d1 in FIG. 6a), the impedance matching and center resonant frequency of the tag antenna can be controlled.

Figure 7:
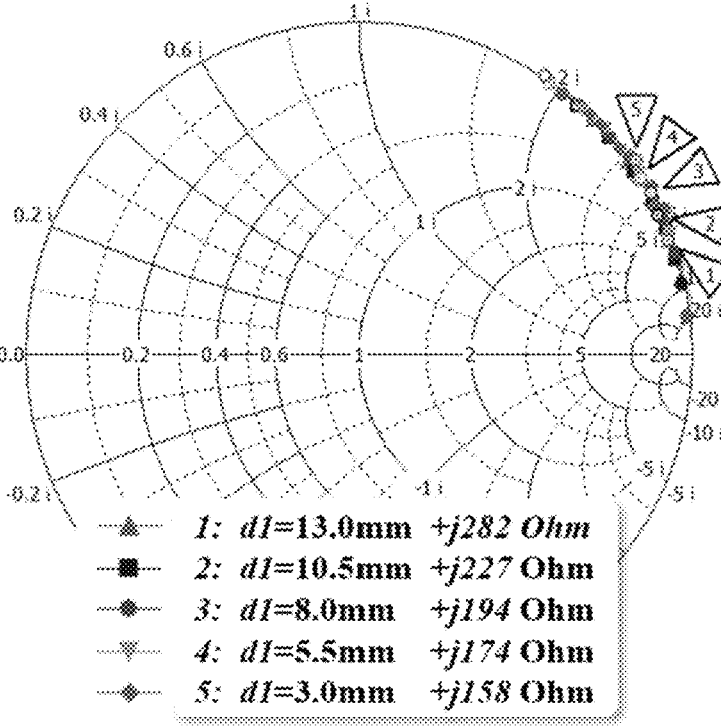
FIG. 7 shows, in Smith chart, the simulation experimental results of the impedance of a radiation element varying with the distance between the PCB disposed in the first segment and the side connected to the conductor according to an embodiment of the present invention.

FIG. 7 shows, in Smith chart, the simulation experimental results of the impedance of a radiating element varying with the distance between the PCB 530 disposed in the first segment 520 and the side connected to the conductor 550 (i.e., d1 in FIG. 6a) according to an embodiment of the present invention. As an example, this simulation experiment result takes the structure of: forming a conductor 550 by folding the metal wire into a vertical direction on one side, so that the first segment 520 and the second segment 540 are short-circuited via the conductor 550 and are disconnected on the opposite side to realize effective impedance matching of complex impedances of common IC chips. That is, on the right side of the tag antenna 510, the first segment 520 and the second segment 540 may be short-circuited through the conductor 550 in the mounting groove 560c on a side, and in order to achieve effective impedance control and appropriate tag radiation gain, on the left side of the tag antenna 510, the first segment 520 and the second segment 540 may be separated by a distance h2 and the first segment 520 and the upper surface of the metal plate 330 may be separated by a distance h1. All the above design parameters are to effectively control the center frequency and impedance matching of the tag component 300, and such a structure with a short circuit on one side and the PCB 530 disposed in the accommodation space may be used as important design parameters to control the impedance matching of the tag component 300.

As shown in FIG. 7, the imaginary part of the impedance of the IC chip during the process of d1 gradually changing from 13 mm to 3 mm at an interval of 2.5 mm is shown in the Smith chart. When d1 is 13.0 mm, the imaginary part of the complex impedance is +282 Ohm; when d1 is 10.5 mm, the imaginary part of the complex impedance is +227 Ohm; when d1 is 8.0 mm, the imaginary part of the complex impedance is +194 Ohm; when d1 is 5.5 mm, the imaginary part of the complex impedance is +174 Ohm; when d1 is 3.0 mm, the imaginary part of the complex impedance is +158 Ohm. Generally, the impedance of commonly used IC chips in UHF band is within the above range, and general impedance matching of commonly used IC chips in UHF band can be achieved by utilizing the variable location of the PCB 530.

In addition, spacing h1 may be formed between the first segment 520 of the tag antenna 510 and the upper surface of the metal plate 330. Such coupling can have an impact on tag matching and far-field radiation pattern directivity.

The first segment 520 of the tag antenna 510 may be coupled with the metal plate 330 in an asymmetrical structure, and the plane in which the tag antenna 510 is located may be at an angle (preferably, vertically) relative to the upper surface of the metal plate 330. As such, the far-field radiation pointing angle of the tag component 300 is deflected in a certain direction.

Figure 8:
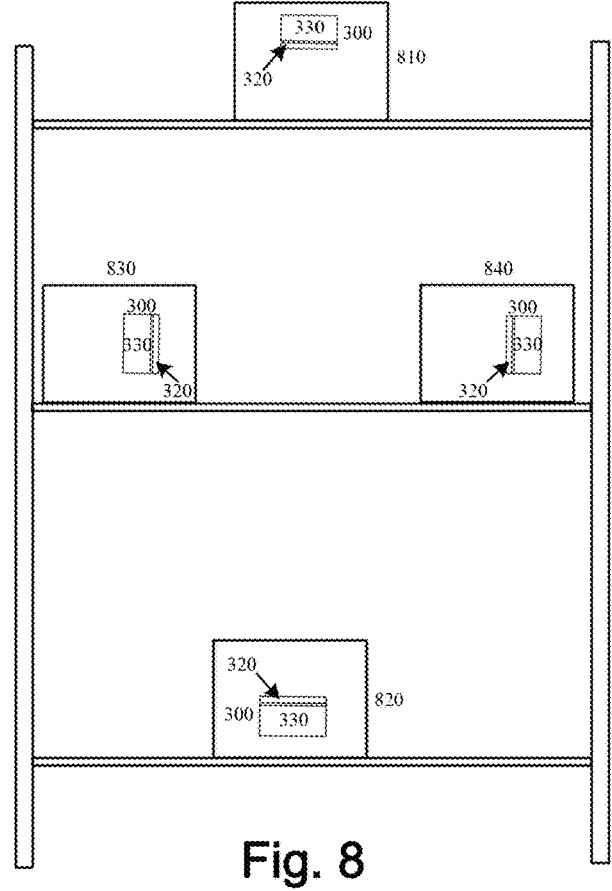
FIG. 8 shows the mounting direction of an RFID tag component at different relative locations on an attached object.

FIG. 8 schematically presents the mounting direction of an RFID tag component at different relative locations on an attached object.

The radiation element 320 containing the tag antenna 510 can be mounted to the metal plate 330 through a fixing mechanism, and the overall appearance of the tag component 300 formed thereby may be formed into a symmetrical structure in the left and right direction and an asymmetrical structure in the up and down direction. In such an asymmetrical structure, the peak radiation gain of the radiation element 320 may be presented as being deflected from a direction perpendicular to the surface of the metal plate 330 to a direction toward the radiation element 320. Such a characteristic makes the direction of peak radiation gain of the tag component 300 to be tilted downward when the radiation element 320 is located along the lower edge of the metal plate 330 in a facility property 810 at a higher height. Conversely, the peak radiation gain of the tag component 300 may be tilted upward when the radiation element 320 is located along the upper edge of the metal plate 330 in the case of a facility property 820 at a lower height, so that the readable identification distance of the tag component is increased. The peak radiation gain of the tag component 300 may be tilted to the right when the radiation element 320 is located along the right edge of the metal plate 330 in the case of the facility asset 830 on the relative left side. The peak radiation gain of the tag component 300 may be tilted to the left when the radiation element 320 is located along the left edge of the metal plate 330 in the case of the facility asset 840 on the relative right side, so that the readable identification distance of the tag component is increased.

Figure 9A:
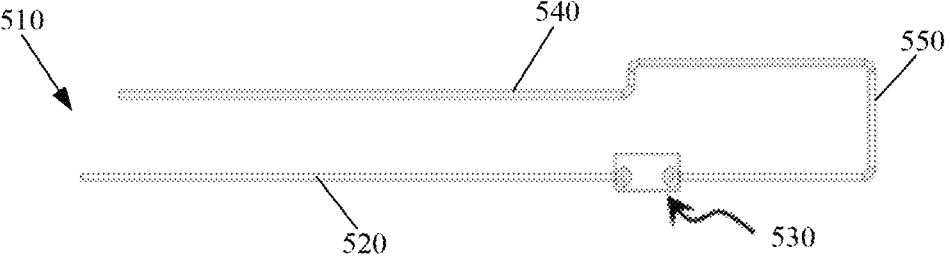
FIG. 9a-FIG. 9d show front views of structures of the first segment and the second segment changed utilizing a tag antenna according to an optional embodiment of the present invention.
Figure 9B:
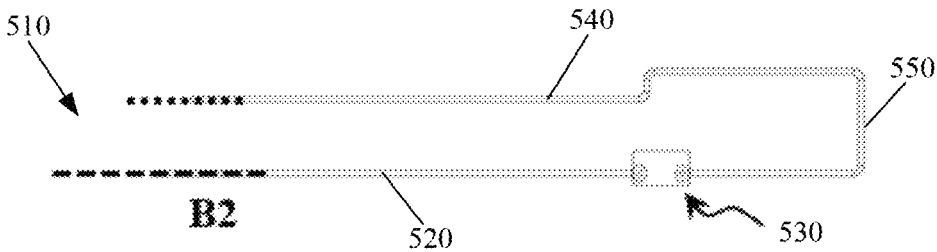
Figure 9C:
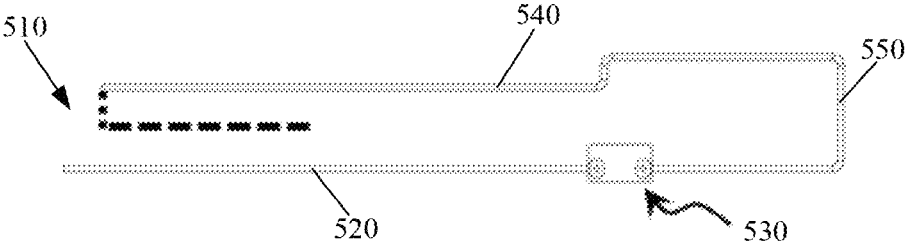
Figure 9D:
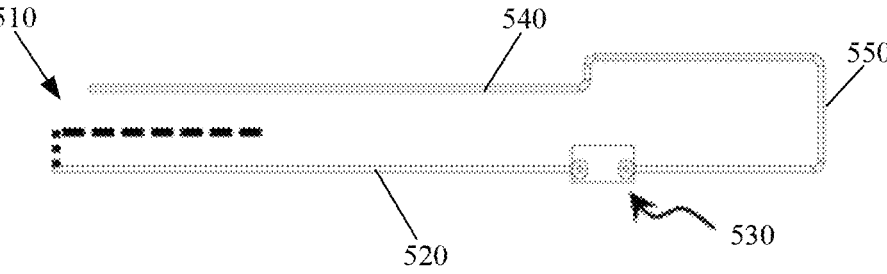

FIG. 9a-FIG. 9d show front views of structures of the first segment 520 and the second segment 540 changed utilizing the tag antenna 510 according to an optional embodiment of the present invention. According to one embodiment of the invention, the PCB 530 may be located in the first segment 520 of the tag antenna 510 and may be short-circuited on one side of the tag antenna 510 and disconnected on the opposite side. Those skilled in the art may contemplate that by changing the above structure of the tag antenna 510 into any shape, it can be used as a variable to achieve center frequency adjustment of the radiation element 320 and conform with optimum impedance matching of individual IC chips. A basic structure in which the PCB 530 may be located near a side in the first segment 520 of the tag antenna 510 is shown in FIG. 9a. A deformation structure in which the first segment 520 and the second segment 540 of the tag antenna 510 may both be extended in the horizontal direction on the disconnected side compared to FIG. 9a is shown in FIG. 9b. Such an increase in length in the horizontal direction may be used as the most important design parameter for downward adjustment of the center frequency of the tag component, and according to the adjustment of the relative lengths of the first segment 520 and the second segment 540 of the tag antenna 510, it may be used as a design parameter to control radiation gain. A deformation structure in which the second segment 540 of the antenna 510 can be bent downward at the disconnected side is shown in FIG. 9c, and a deformation structure in which the first segment 520 of the antenna 510 can be bent upward at the disconnected side is shown in FIG. 9d. In order to achieve such a bending structure, the mounting grooves in the tag housings 500a, 500b may include more horizontal grooves (for example, 560d in FIG. 5) and/or vertical grooves (for example, 560e in FIG. 5), thereby increasing the effective resonant length of the tag antenna 510 without changing the outline size of the radiation element 320. However, the upward bending of the first segment 520 of the antenna 510 and the downward bending of the second segment 540 of the antenna 510 and the corresponding more horizontal grooves are optional. Those skilled in the art may choose different grooving methods as needed, and it is not intended to be limited by the present invention.

Figure 10:
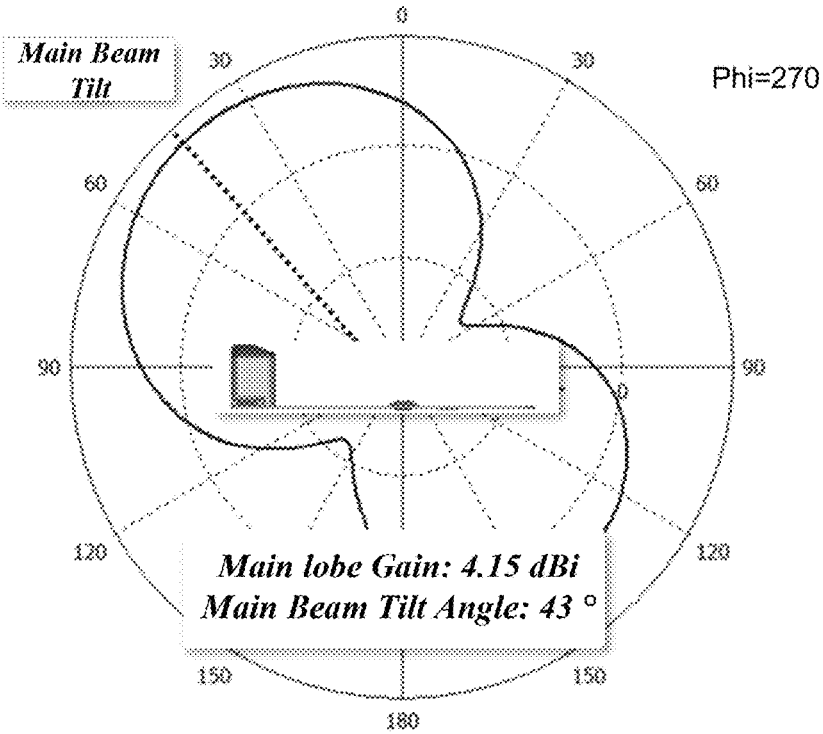
FIG. 10 shows a diagram of a radiation pattern of a peak radiation gain depending on an azimuth angle of a tag antenna having a function of variable main radiation directivity according to an embodiment of the present invention.

FIG. 10 shows a diagram of a radiation pattern of a peak radiation gain depending on an azimuth angle of a tag antenna having a function of variable main radiation directivity according to an embodiment of the present invention, showing a radiation direction diagram of the YZ plane (phi=90°) with the UHF band center frequency of 920 MHz. Considering the situation of being attached to a metal attached object, the size of the metal plate capable of surface stamping may be set as 85×58 mm, and the metal plate may cause changes in radiation gain with the size and relative location of the metal attachment object change.

The directivity of peak of radiation gain of usual tag antenna 510 is formed in the direction perpendicular to the surface of the metal attached object. However, the radiation element 320 of the present invention with a function of variable main radiation directivity may be located on one side of the metal plate 330, and the main radiation thereof may be formed to be tilted at 43° from the vertical direction. As shown, a peak radiation gain of 4.15 dBi in the far-field radiation mode and the left-right asymmetry from left to right on the Y-Z plane are exhibited.

Such a structure of the radiation element 320 whose peak radiation gain is deflected at a particular pointing angle may effectively improve the problem of low far-field identification performance due to the height difference between the RFID reader antenna and the tag antenna. According to the height of the tag attached object and the left-right identification angle deviation, simply changing the up-down, left-right attaching directions of the tag effectively improves the communication sensitivity of the RFID reader when there are orientation and position differences (height difference and left-right differences). That is, when the tag attached height is higher than the height of the RFID reader, the tag radiation gain directivity may be deflected downward by attaching and fixing the tag housing 320 to the lower side of the metal plate 330; on the contrary, when the tag attached height is lower than the height of the RFID reader, the tag radiation gain directivity may be deflected upward by attaching and fixing the tag housing 320 to the upper side of the metal plate 330. By attaching the same tag housing 320 in different directions according to the attaching height difference or the left-right identification angle deviation, the peak radiation gain direction of the tag may be deflected, and the main radiation directivity of the tag may be controlled without using another mechanical bracket.

Figure 11:
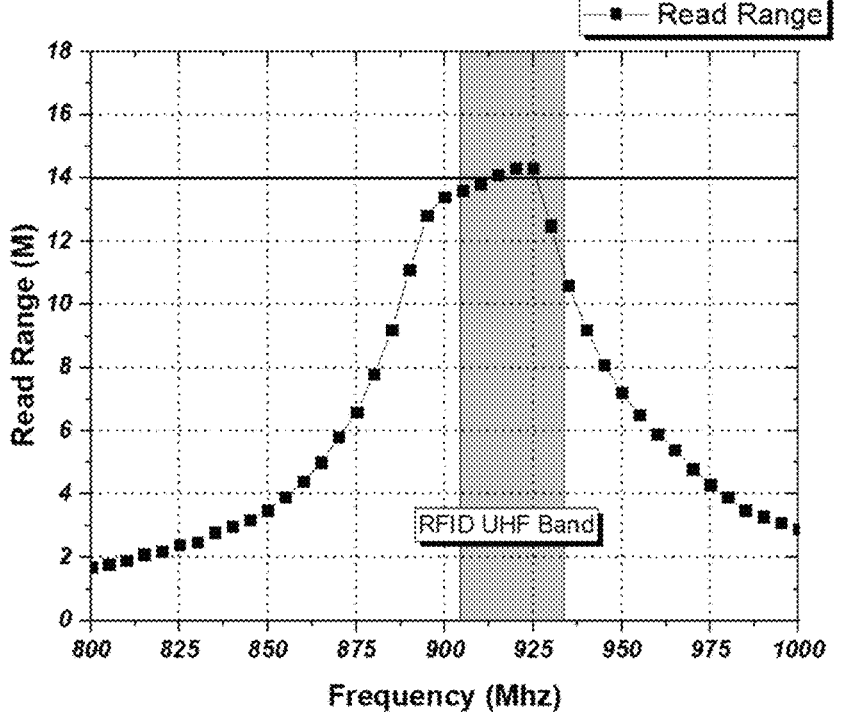
FIG. 11 shows the result of measuring the far-field identification distance of an RFID tag antenna having a function of variable main radiation directivity using a tag antenna in the UHF RFID frequency band according to an embodiment of the present invention.

FIG. 11 shows the result of measuring the far-field identification distance of an RFID tag antenna having a function of variable main radiation directivity using a tag antenna in the UHF RFID frequency band according to an embodiment of the present invention. The tag component 300 for measurement may be located in the middle of a square metal plate with a side length of 15 cm used as an attached object and may measure by using the Tagformance system of Voyantic company in a microwave Anechoic chamber with standard power of 36 dBm. The identification distance of tag components attached to metal attached objects may be measured in the vertical/frontal direction. As shown in FIG. 10, there may be a peak identification distance of 14 m at the UHF band center frequency of 920 MHz.

So far, an RFID tag component has been described. By constructing a flexible metal wire into a three-dimensional shape for an RFID tag radiation element of the UHF band and mounting the radiation element to a metal plate in an asymmetrical manner, the peak radiation gain direction of the RFID tag component may be tilted at a particular angle. In various RFID application environments, the readable identification distance performance for existing RFID tags drops sharply with the difficulty to obtain the height location of the RFID tag component and the line-of-sight (LOS) distance of the reader antenna used for identification. In particular, in the case where the RFID tag is identified in a direction tilted from the horizontal direction or the height of the tag attached to the facility property is higher or lower, on the basis of the reader antenna, the RCS cross-sectional area of the tag is reduced sharply, the reflecting scattering efficiency is reduced, resulting in reduced performance of RFID tag identification. In such special case, the RFID tag proposed by the present invention changes the tag attachment method to deflect the tag's peak radiation gain directivity up and down and left and right, thereby effectively ensuring the performance of the readable identification distance of the tag and improving the performance of the RFID system. In the present invention, metal wires are used for tag radiation elements to provide tag durability in high-temperature application environments and thermal impact environments, thereby greatly improving tag degradation characteristics.

In particular, the tag radiation element of the metal wire disposed and encapsulated within the plastic structure and the additionally combined metal plate are physically separately constructed and combined with mounting mechanism, thereby achieving an embossing operation or a stamping operation protruding from the surface of the metal plate, and such marking operation may provide an advantage of not affecting the appearance or electrical characteristics of the tag. In addition, the separately constructed metal plates may be of various sizes and are combined together with metal wires embedded in the plastic structure after individually constructed.

As mentioned above, semi-permanent and intuitively identifiable marks required by specific application fields may be provided through mechanical embossing/stamping on the surface of metal plates, and the application can be expanded to additionally implement electrical RFID tag functions. Existing RFID tags do not have products with metal plates on the tag surface, or even if they do have, physical stamping/embossing on the tag surface will physically damage the tag itself, causing waterproofing problems and problems of reduced tag durability. The present invention improves tag durability and design flexibility by independently separating the electrical engagement of the tag antenna and the basic design parameters that determine the tag's radiation gain. That is, the electrical RFID tag design is separated from the metal plate, and then the two are combined through a mounting mechanism so that the mechanical stamping/embossing operation does not affect the electrical/physical performances of the tag.

Some exemplary embodiments have been described above. However, it should be appreciated that various modifications can be made to the above described exemplary embodiments without departing from the spirit and scope of the invention. For example, if suitable results can be achieved with the described techniques being performed in a different order and/or with components of the described systems, architectures, devices, or circuits combined differently and/or replaced or supplemented by additional components or the equivalents thereof, then accordingly, other modified implementations also fall within the scope of the claims.

The invention claimed is:

1. A radio frequency identification tag component, wherein the radio frequency identification tag component comprises:
   a metal plate with an upper surface and a lower surface;
   a radiation element comprising a tag housing, the tag housing is arranged along a side of the upper surface of the metal plate, the tag housing contain therein an IC chip, an antenna and a circuit board electrically connecting the IC chip with the antenna, wherein,
   the antenna is made of metal, and
   the antenna has a first segment and a second segment parallel to the upper surface of the metal plate, there is a first spacing between the first segment and the upper surface of the metal plate, and there is a second spacing between the first segment and the second segment, and the upper surface of the metal plate is at an angle to the plane in which the antenna is located.

2. The radio frequency identification tag component of claim 1, wherein the IC chip operates in the UHF band.

3. The radio frequency identification tag component of claim 1, wherein one end of the first segment of the antenna is connected to one end of the second segment via a conductor.

4. The radio frequency identification tag component of claim 3, wherein the conductor is a bent portion between the first segment and the second segment of the antenna, and the first segment, the second segment and the bent portion integrally form the antenna.

5. The radio frequency identification tag component of claim 3, wherein the conductor is a wire arranged within the housing separate from the antenna.

6. The radio frequency identification tag component of claim 3, wherein the housing has mounting grooves therein to embed the antenna and the circuit board.

7. The radio frequency identification tag component of claim 6, wherein the mounting grooves comprise:

a plurality of grooves for embedding the antenna, wherein the plurality of grooves include a plurality of horizontal grooves and a plurality of vertical grooves, the plurality of horizontal grooves include a first horizontal groove and a second horizontal groove, the first horizontal groove is configured to embed the first segment of the antenna, the second horizontal groove is configured to embed the second segment of the antenna, and the vertical groove is configured to embed the conductor; and a plurality of accommodation spaces, each of the plurality of accommodation spaces is used to accommodate the circuit board.

8. The radio frequency identification tag component of claim 7, wherein each of the plurality of horizontal grooves intersects at least one of the plurality of accommodation spaces, the plurality of horizontal grooves are parallel to the upper surface of the metal plate, and the plurality of horizontal grooves are at different distances from the upper surface of the metal plate, and the plurality of accommodation spaces are separated from the vertical grooves by a plurality of distances.

9. The radio frequency identification tag component of claim 7, wherein the first segment of the antenna extends to a third horizontal groove of the plurality of horizontal grooves, and/or the second segment of the antenna extends to a fourth horizontal groove of the plurality of horizontal grooves.

10. The radio frequency identification tag component of claim 9, wherein the first horizontal groove is configured to be able to embed the first segment of the antenna of different lengths, and the second horizontal groove is configured to be able to embed the second segment of the antenna of different lengths.

11. The radio frequency identification tag component of claim 1, wherein the plane in which the antenna is located is perpendicular to the upper surface of the metal plate.

12. The radio frequency identification tag component of claim 1, wherein the metal plate serves as a ground plate of the radio frequency identification tag component.

13. The radio frequency identification tag component of claim 1, wherein the radio frequency identification tag component is disposed by attaching a lower surface of the metal plate to an object to be identified.

14. The radio frequency identification tag component of claim 1, wherein the tag housing is fixed to the metal plate through a locating mechanism such that the lower surface of the tag housing remains horizontal relative to the upper surface of the metal plate.

15. The radio frequency identification tag component of claim 14, wherein the locating mechanism includes a threaded piece that fixes the tag housing to the metal plate and a lattice-shaped fastener located on the upper surface of the metal plate.

16. The radio frequency identification tag component of claim 1, wherein the metal plate is embossed, stamped, laser processed or printed with visual identifiers.

17. The radio frequency identification tag component of claim 1, wherein the direction of the peak radiation gain of the radio frequency identification tag component is tilted from a direction perpendicular to the metal plate.

18. An identifiable object to which the radio frequency identification tag component of claim 1 is attached.

19. The identifiable object of claim 18, wherein the identifiable object includes equipment properties and shelves.

* * * * *